United States Patent [19]
Burgdorf et al.

[11] Patent Number: 5,474,106
[45] Date of Patent: Dec. 12, 1995

[54] SOLENOID VALVE FOR HYDRAULIC BRAKE UNITS WITH SLIP CONTROL

[75] Inventors: Jochen Burgdorf, Offenbach-Rumpenheim; Peter Volz, Darmstadt; Andre F. L. Goossens, Rumst, all of Germany

[73] Assignee: Alfred Teves GmbH, Frankfurt am Main, Germany

[21] Appl. No.: 140,859

[22] Filed: Dec. 1, 1993

Related U.S. Application Data

[62] Division of Ser. No. 856,038, May 7, 1992, Pat. No. 5,318,066.

[51] Int. Cl.[6] .................................................. F16K 17/06
[52] U.S. Cl. ............................................ 137/495; 137/509
[58] Field of Search ..................................... 137/495, 509

[56] References Cited

U.S. PATENT DOCUMENTS 3,236,256  2/1966  Valentine .................................. 137/509

Primary Examiner—Robert G. Nilson
Attorney, Agent, or Firm—Robert P. Seitter; J. Gordon Lewis

[57] ABSTRACT

A solenoid valve for hydraulic brake units with slip control is described which has a magnetic armature (2) surrounded by a valve dome (14), the magnetic armature (2) positioned by energization of a magnet coil (16), so that a valve needle (1) which is carried by the magnetic armature (2) is moved onto a valve seat (3). A hydraulic actuating force is generated by an arrangement causing the valve needle (1) to open even through the solenoid valve is energized causing the valve to act as a pressure relief or limiter valve.

4 Claims, 1 Drawing Sheet

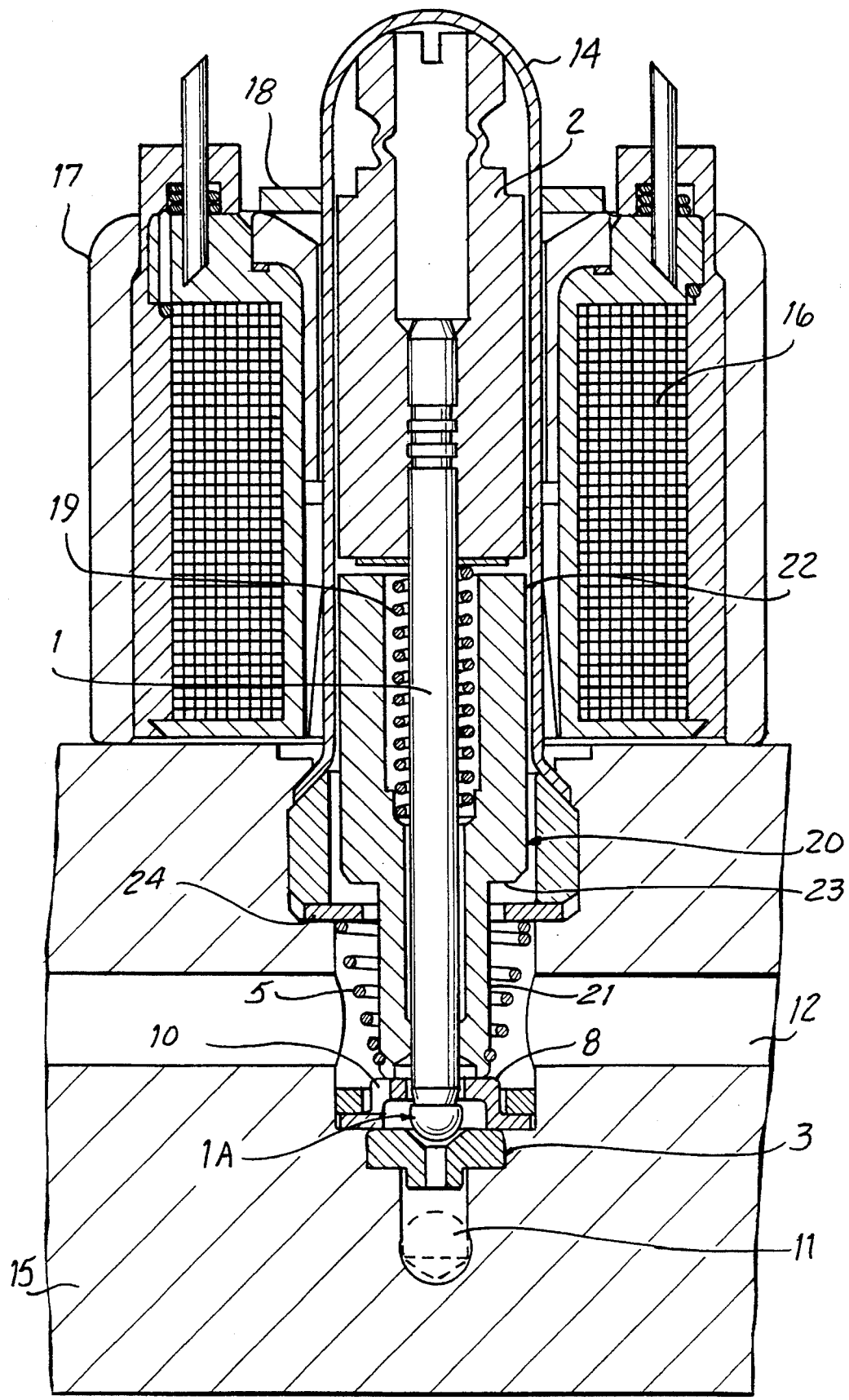

SOLENOID VALVE FOR HYDRAULIC BRAKE UNITS WITH SLIP CONTROL

CROSS REFERENCE TO RELATED APPLICATIONS

This is a divisional of U.S. Ser. No. 07/856,038, filed on May 7, 1992, now U.S. Pat. No. 5,318,066.

BACKGROUND OF THE INVENTION

The invention is related to a solenoid valve for hydraulic brake units with slip control.

In the solenoid valves for hydraulic brake units with slip control for example as shown in German patent application published without examination, No. 3,739,915, special pressure limiting valves which are structurally separate from the traction slip control inlet solenoid valves are provided in order to limit the pump pressure to an established maximum value. Indeed, during the traction slip control action, the traction slip control solenoid valves which take the form of isolating valves and are arranged downstream of the master cylinder, are closed. Thus, upon start up of the auxiliary pressure pumps for the purpose of traction slip control action, the brakes of the driven wheels are subjected to the system pressure being monitored by the pressure limiting valves, a return of hydraulic fluid through the pressure limiting valves into the master cylinder being rendered possible only by the admissible pressure of the traction slip control system being exceeded.

The requirement of separate pressure limiting valves lead to an expensive brake unit and has thus proved disadvantageous.

The invention has, therefore, the object to further develop a compact solenoid valve whose number of component parts is minimized by integration of the pressure limiter function.

SUMMARY OF THE INVENTION

According to the invention, this object is achieved by providing an arrangement for countering the electromagnetic actuating force, with a hydraulic actuating force to cause a functionally overlapping valve opening action depending on the system pressure. The solenoid valve according to the invention thus also acts as a pressure limiting or relief valve.

In order to support and guide the valve needle onto the valve seat, a guide element receiving one end of the valve needle is provided. The guide element has to be positioned as near as possible to the end of the valve needle.

A particularly good radial support of the valve needle within the guide element is provided by a cross sectional shape which extends convergently as well as divergently.

A plurality of through bores which are distributed about the circumference are provided in a flared portion of the guide element which faces the valve seat in order to insure an unrestricted passage of hydraulic fluid between the two hydraulic fluid ducts when the valve needle is in the open position.

An advantageous embodiment of the invention is constituted by the arrangement of a stepped, cylindrical hydraulic actuator sleeve, axially movably guided on the valve needle.

In one switching position, the actuator sleeve is initially abutted with a first section against the guide element while in a second switching position of the actuator sleeve determined by the hydraulic pressure, the actuator sleeve contacts the front surface of the magnetic armature in order to move the magnetic armature and attached valve needle in the direction so as to open the valve whenever the hydraulic pressure reaches a sufficiently elevated level. As a consequence, any excessive hydraulic pressure can be discharged when the valve needle fastened to the magnetic armature is lifted off from the valve seat.

The normal position of the actuator sleeve is defined by a spring element which is compressed against the valve housing and acts on the first section. A return spring is compressed between a second section of the actuator sleeve and the magnetic armature which maintains the necessary air gap between the magnetic armature and the actuator sleeve.

In order to generate an actuating force acting on the valve needle corresponding to the hydraulic pressure, a transition between the first and the second sections of the actuator sleeve is formed as an annular surface on which the hydraulic pressure is exerted. The actuator sleeve shifts into engagement with the magnetic armature as soon as the admissible system pressure is exceeded.

DESCRIPTION OF THE DRAWINGS

The Figure is a cross sectional view of an embodiment of the solenoid valve according to the present invention.

DETAILED DESCRIPTION

A relatively thin-walled formed valve dome 14 is fixed within the valve housing 15, the magnetic coil 16 slipped over the dome 14 and fixed by means of a locking ring 18 which is abutted against the coil housing 17 and against the valve dome 14. A valve needle 1 is shown in the electromagnetically non-energized, normal position which allows free passage of the hydraulic fluid through an annular clearance between the valve seat 3 and the lower end 1A of the valve needle 1. An open hydraulic fluid connection thus exists between the first and the second hydraulic fluid ducts 11, 12.

Due to the actuating force which is brought about when the magnetic coil 16 is energized by electrical current, the valve needle 1 will move down against the valve seat 3 so that the hydraulic connection between the first and second hydraulic fluid ducts 11, 12 is interrupted. As soon as the pressure acting on the valve needle 1 in the second hydraulic fluid duct 11 exceeds a predetermined level, the valve needle 1 will be retracted by means described below.

Referring to the brake pressure control of the engine-driven vehicle wheels being subject to the risk of traction slip, that is to say, to the type of control of the brake pressure which is customary in hydraulic brake units with traction slip control, an inadmissibly high system pressure in the second hydraulic fluid duct 12 can open the valve needle 1 even though the solenoid valve is energized to act as an isolating valve to interrupt the hydraulic fluid connection to the first hydraulic fluid duct 11.

The excessive brake pressure existing in the second hydraulic fluid duct 12 is thus freely relieved through the opened valve seat 3 into the guide element 8 through radial hydraulic fluid passages 10 closely surrounding the valve needle 1. Radial hydraulic fluid passages 10 allow the brake pressure to be relieved without restriction in the direction of the first hydraulic fluid duct 11.

To counteract the actuating movement of the magnetic armature 2 which is brought about electromagnetically, there is interposed a hydraulic actuator sleeve 20. The return spring 19 is received within a bore in the second section 22 of the actuator sleeve 20 so as to be compressed between the second section 22 of the actuator sleeve 20 and the front surface of the magnetic armature 2. The force exerted determines the air gap therebetween and thereby also the switching behavior of the magnetic armature 2 in the well known manner.

The spring element 5 has one end which engages the first section 21 of the actuator sleeve 20 and the other end is compressed against a stop disc 24 which is anchored on one end of the valve housing 15. The first section 21 is thereby normally held against the valve guide 8 having radial flow passages 10.

The force of the spring element 5 acting on the actuator sleeve 20 regulates the opening hydraulic pressure necessary to cause retraction of the valve needle 1.

This pressure also depends on the area of a pressurized annular surface 23 located at the transition between the first section 21 and second section 22 of the actuator sleeve 20. In this configuration, it is advantageous for manufacturing expediency that the stop disc 24 is inserted between the magnetic core 13 which is fixed in the valve housing 15.

Upon energization of the coil 16 of the solenoid, the magnetic armature 2 and the attached valve needle 1 are moved downwardly to seat the end 1a of the needle valve 1 onto the seat 3 and close the valve. This leads to a contacting of the armature 2 with the actuator 20, which is shown in the position of rest in the drawing. Consequently, the air gap between the magnetic armature 2 and the actuator 20 is bridged. Depending on the hydraulic pressure in the second hydraulic fluid duct 12, an actuating force, determined by the spring rate of the spring element 5 and by the area of the annular surface 23, can become effective countering the magnetic force, in order to move the valve needle 1 upwardly and off the valve seat 3 to open the valve.

Thus, in a comparatively simple way a solenoid valve is provided which acts also as a pressure relief valve and is optimized as to the few number of components and as a result a major reduction of the necessary component parts is achieved and, thus, of the overall space required, and leads to a decrease of the cost of the solenoid valve.

Due to the structural and functional integration of a pressure relief valve within an electromagnetically controlled two-position valve and to the consequent reduction of the component parts otherwise required, a functionally extended pilot valve is realized.

Other versions of the invention are possible. The present invention may be applied by analogy to all pressure fluids which have to be controlled electromagnetically and which require a system pressure control.

We claim:

1. A solenoid valve for hydraulic brake units with slip control, including a valve housing, having a first and second fluid passages therein communication therebetween to be controlled by said solenoid valve, a magnetic armature movably mounted within said valve housing, a surrounding magnetic coil energizable by electric current to cause stroke movement of said magnetic armature, an elongated valve needle drivingly carried with said magnetic armature, a valve seat interposed between said first and second fluid passages, said valve seat fixed within said valve housing and having an opening defining a flow path between said first and second fluid passages, said valve needle extending through said second fluid passage and aligned with said valve seat opening, said valve needle having one end movable onto said valve seat to block said opening upon movement of said magnetic armature caused by energization of said magnet coil and thereby close communication of said first fluid passage with said second fluid passage, and pressure relief means responsive to development of a predetermined pressure in said second fluid passage to cause unseating of said one end of said valve needle and opening of communication between said first and second fluid passages notwithstanding said magnetic coil being energized;

said pressure relief means including an actuator sleeve slidably mounted on said valve needle, having a first and second section, said actuator sleeve having a first, normal switching position with said second section spaced from said magnetic armature, and a second switching position wherein said second section of said actuator sleeve is abutting said magnetic armature, said actuator sleeve having a surface configured to subject said actuator sleeve to hydraulic pressure in said second passage to generate a net force urging said actuator sleeve to said second position.

2. A solenoid valve as claimed in claim 1, wherein said first section of said actuator sleeve is formed by a guide bushing which surrounds said valve needle and a spring element having one end engaging said valve housing and another end engaging said first section to urge said actuator sleeve away from said magnetic armature.

3. A solenoid valve as claimed in claim 1, further including a return spring urging said actuator sleeve away from said magnetic armature and wherein said second section is formed with a hollow cylinder-shaped bore which receives said return spring which contacts said magnetic armature at one end.

4. A solenoid valve as claimed in claim 1, wherein said first and said second section of said actuator sleeve are joined at a transition formed by an annular surface, said annular surface comprising said surface subject to pressure in said second fluid passage to urge said actuator sleeve towards said magnetic armature.

* * * * *